(12) United States Patent
Faber et al.

(10) Patent No.: US 7,388,975 B2
(45) Date of Patent: Jun. 17, 2008

(54) METHOD, SYSTEM AND COMPUTER PROGRAM FOR POST-PROCESSING IMAGE DATA FROM AN IMAGING MODALITY

(75) Inventors: Roland Faber, Uttenreuth (DE); Isabelle Janssen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 626 days.

(21) Appl. No.: 10/964,425

(22) Filed: Oct. 13, 2004

(65) Prior Publication Data
US 2005/0147311 A1 Jul. 7, 2005

(30) Foreign Application Priority Data
Oct. 13, 2003 (DE) ............................. 103 47 435

(51) Int. Cl.
*G06K 9/00* (2006.01)
(52) U.S. Cl. .................. 382/128; 382/240; 430/401
(58) Field of Classification Search ............... 382/128, 382/129, 130, 131, 132, 133, 134, 240; 378/4, 378/21, 23, 24, 25, 26, 27, 901; 600/425, 600/407, 410; 430/401
See application file for complete search history.

(56) References Cited
U.S. PATENT DOCUMENTS
5,935,060 A * 8/1999 Iliff ............................. 600/300
6,019,725 A * 2/2000 Vesely et al. ................ 600/447
6,097,833 A * 8/2000 Lobregt et al. .............. 382/130
6,530,887 B1 * 3/2003 Gilbert et al. ............... 600/459

FOREIGN PATENT DOCUMENTS
GB 2 383 509 5/2003

OTHER PUBLICATIONS
"Handbuch der Medizinischen Informatik," Lehmann et al (2002).
"Operating System Design—The XINU Approach" Comer, 1984, ISBN 0-13-637539-1, pp. 68-71.
"Persistent Applications via Automatic Recovery," Barga et al., 7th Int'l Database Engineering and Applications Symposium, Hong Kong, Jul. 16-18, 2003, pp. 258-267.
"Enabling Internet Suspend/Resume with Session Continuations," Snoeren, Student Oxygen Workshop, Gloucester, MA, Jul. 17, 2002, http://sow.ics.mit.edu/2002/proceedings.html and http://sow.ics.mit.edu/2002/proceedings/snoeren.pdf.

* cited by examiner

*Primary Examiner*—Abolfazl Tabatabai
(74) *Attorney, Agent, or Firm*—Schiff Hardin LLP

(57) ABSTRACT

In a method and system for post-processing at least image data acquired by an imaging modality in a post-processing procedure on an image processing station of an image processing system, the post-processing procedure is stored with all partial-procedures and/or sub-procedures upon an interruption before its regular ending with all current process data at this point in time. The image processing station thus is available for another post-processing procedure and the original post-processing procedure is continued given a recall into a process state present at the point in time of the interruption.

17 Claims, 3 Drawing Sheets

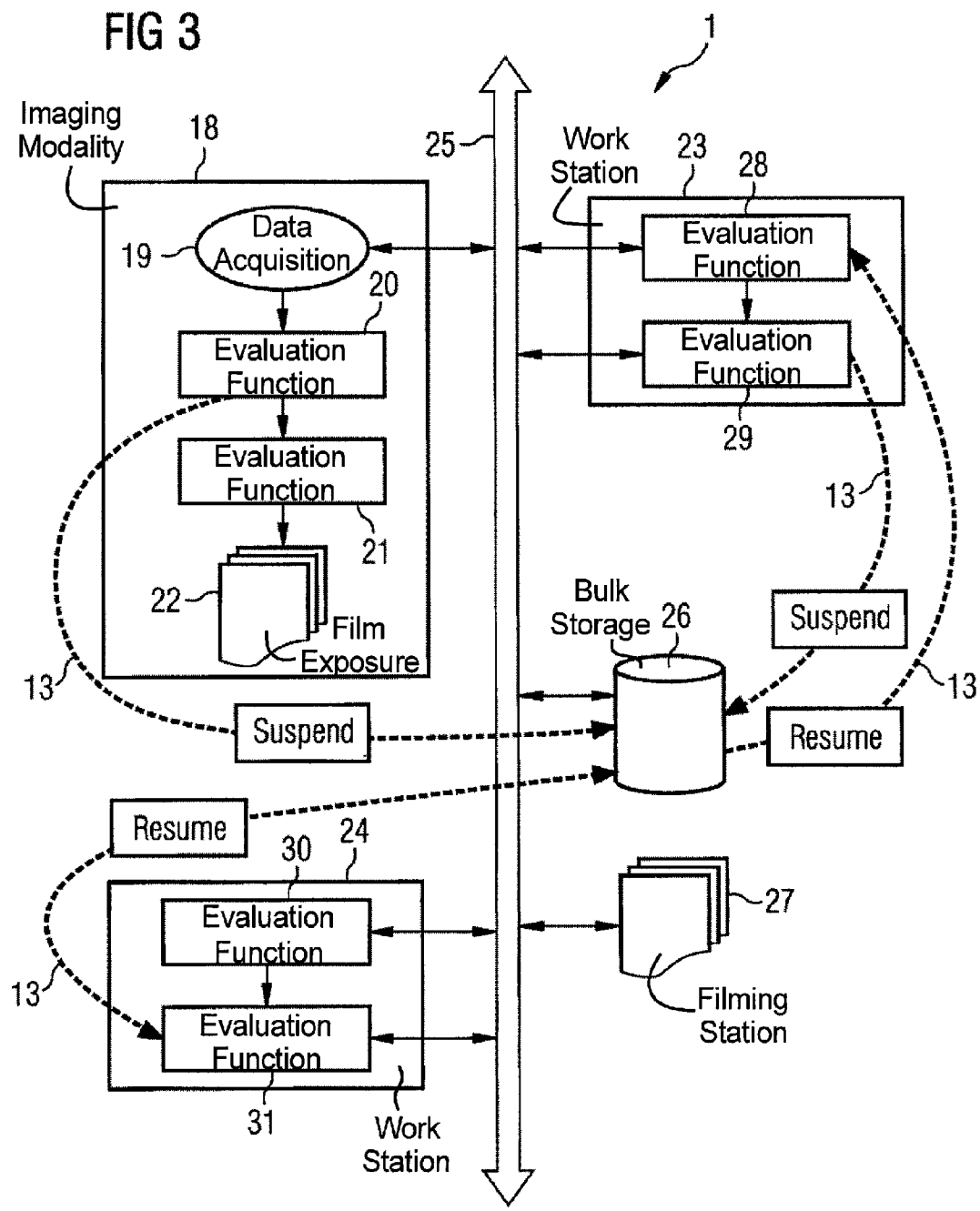

METHOD, SYSTEM AND COMPUTER PROGRAM FOR POST-PROCESSING IMAGE DATA FROM AN IMAGING MODALITY

BACKGROUND OF THE INVENTION

Field of the Invention

The invention concerns a method for post-processing, in a post-processing process on an image processing station of an image processing system, of at least image data acquired by an imaging modality. The invention also concerns an image processing system and a computer program with which such a method can be implemented.

Medical image data acquisition and processing allows, via various examination methods, a more precise image to be created about the individual anatomy of the patient as well possible anomalies. Such visualizations can be needed not only for a precise diagnosis creation, but also can be used for simulation and planning of operations, due to their precision. For example, computed tomography (CT) and magnetic resonance tomography (MRT) are among the typical modern imaging modalities. In CT, the raw image data acquisition ensues by means of x-ray irradiation and detection, in MRT by means of a radio-frequency excitation of nuclear spins of tissue of a subject in a high magnetic field. From the raw image data, cross-section images of the examined body section of the patient are then created. The various acquisition methods, since their introduction, have experienced a rapid technical development. Still, the image quality could be improved decidedly and the acquisition time could be significantly reduced. A modern multilayer CT enables, for example, a person to be completely exposed in approximately 90 seconds. More than 900 images can be created, with which the entire body can be represented three-dimensionally. Based on this, precise diagnostic illustrations of very high-detail precision support an examination of the most varied organs. Catheter examinations in the heart region already can be replaced by this technology.

In general, however, the preparation and evaluation of the large number of images is particularly time-consuming in such examinations. After the examination, the necessary two- or three-dimensional images of the body regions or organs to be examined are created in specific post-processing method, wherein a number of various typical images that are necessary for a finding are to be produced depending on the type of the examination. Such a post-processing method is executed in an image processing system. For this purpose, the studies or image series that are necessary for the desired evaluation are selected patient lists (in which all image data and other data of the patient are stored in a sorted and retrievable manner) and loaded Into specific (so-called) "post-processing cards". A specific working process is thereby associated with each post-processing card. This processing predominantly ensues manually and is, depending in part on the evaluation, extraordinarily time-consuming. The resulting images are then stored and/or, for example, displayed on a screen, or films of these images that can be viewed in a classical manner in front of a light box are produced at a filming station. Finally, a finding is made based on the reconstruction images. A majority of the primary work of the MRTAs (medical technical radiological assistants), radiologists and other experts, such as the image processing, image analysis, making findings, comparison with a previous finding or a previous exposure, etc. consequently begins only after the actual acquisition or exposure. The time that elapses before this type of work can be started is not reduced even by the most modern acquisition technique.

A particular problem occurs when the procedure must be interrupted for some reason after the start of a post-processing procedure, for example because image material is necessary for an emergency operation to be implemented immediately, and thus post-processing of the raw image data associated with the emergency given preference. Given the significantly growing number of examinations on imaging modalities, the number of workstations that are available for a post-processing of the raw image data is always very limited within an image processing system. The image processing stations therefore normally are fully occupied. For this reason, a post-processing procedure normally also must be interrupted and the image processing station in use must be released when the operator is needed for a more urgent purpose. In a post-processing procedure that is already begun and then is interrupted, however, all adjustments that were implemented and any intermediate results that were created are invalidated. The appertaining post-processing process must then be restarted anew at a later point in time and/or at another location. This means that the images must be selected again from the patient list and loaded into the necessary post-processing card and the evaluation restarted in this card. Each interruption of an already-started post-processing procedure consequently is associated with corresponding additional expenditure for the person responsible for the post-processing of the raw image data. Moreover, overall the evaluation time is lengthened.

It has long been possible to stop and restart individual technical processes of an operating system for execution of program code. This is, for example, described in the book by Douglas Comer: "Operating System Design—The XINU Approach"; Prentice Hall, 1984; ISBN: 0-13-637539-1, pages 68-71. Furthermore, "Persistent Applications via Automatic Recovery" by R. Barga et. al (7th International Database Engineering and Applications Symposium, Hong Kong, Jul. 16-18, 2003, Pages 258-267) and "Enabling Internet Suspend/Resume with Session Continuations" by A. Snoeren (Student Oxygen Workshop, Gloucester/Mass.; Jul. 17, 2002, http://sow.lcs.mit.edu/2002/proceedings.html and http://sow.lcs.mit.edu/2002/proceedings/snoeren.pdf), possibilities are proposed in order to optimally continue a running internet session without error and without elaborate restarting by the user upon short-duration, unwanted interruptions of internet connections. These proposals offer no solution, however, for the problem of a running process that must be interrupted because the image processing station is to be temporarily released for more important image post-processing and/or because the operator cannot continue the currently running post-processing procedure for specific reasons, and thereby causing significant efficiency losses to occur in the image processing of the image data generated by a modality.

SUMMARY OF THE INVENTION

It is an object of the present invention to increase the efficiency of a post-processing method of the above-described type while preventing the problems cited above.

This object is achieved by a method according to the invention wherein the post-processing procedure is stored, with all partial procedures and/or sub-procedures, upon an interruption before its regular ending, and with all current process data at this point in time, so that the image processing station is available for another post-processing procedure and the original post-processing procedure can be continued given a recall into a procedure state that exists at the point in time of the interruption. The term "process data", as used herein means all settings (such as, for example, in an MIP examination for the representation of vessels, the angle size, the rotation radius, the number of the projections), references to the base data (for example 3-D series), intermediate results or other data necessary for the further implementation of the post-processing process and/or already generated by the post-processing procedure The term "post-processing" as used herein means any form of preparation and evaluation of image date acquired by an imaging modality.

The execution of the current post-processing process, in accordance with the invention, thus is not abandoned entirely, i.e. it is not cancelled but rather only interrupted, meaning "set to pause". This allows the often spontaneously-changing requirements of the clinical everyday to be better accommodated. The later, seamless continuation of a previously begun post-processing process is enabled by securing all process data at the time of the interruption. It is thus advantageously prevented that work and process time invested once must be duplicated. Additionally, after the start of a process the further existence of a possible additional special list can be superfluous when the necessary fine adjustments have been effected once. Also, errors such as can occur in a reproduction of a previously set state, for example the wrong selection of base data or modifications of presets, are prevented.

An image processing system in accordance with the invention for post-processing of at least image data acquired by an imaging modality has at least one user interface for the entry of user-specific inputs, for example, for the input of data, specifications for the evaluation within the post-processing process, etc. Such an image processing system further has a processing unit in which the actual image processing is automatically implemented and a storage device from which data can be retrieved and in which arbitrary data can be cached or permanently stored. The storage device can be one or more storage components connected with one another. The image processing system also has a process control device that archives a running post-processing procedure with all partial-procedures and/or sub-procedures, with all current process data at this point in time, into a storage unit upon an interruption, allowing the image processing system to be available for another procedure and, upon a retrieval, the original post-processing procedure is continued in a process state that existed at the point in time of the interruption.

In an embodiment of the invention, the process data that are current at the point in time of an interruption are persistent, meaning permanently sustained, and stored in a fail-safe manner as far as is possible. There is thus no time limit for continuation of an interrupted post-processing procedure.

Moreover, process data preferably are automatically buffered at temporal intervals during execution of the post-processing procedure. In addition to a time-controlled backup at regularly or irregularly established time intervals, specific results (such as the ending of a section of the procedure, for example the production of an image) can be used as triggers for such a buffering.

Alternatively only a partial-backup of the most recent process data can be implemented. Other suitable back-up strategies can also be used.

The image processing system can have only one image processing station or may have multiple image processing stations. An image processing station normally is already located at the modality, and may be a part of the modality itself, for example the control console. The modality, together with its image processing station, typically is connected to a network with further workstations, which can likewise serve as image processing stations. Generally, one or more bulk storage units, image observation units and/or filming stations are also connected to this network.

The recall (retrieval) of the interrupted post-processing procedure preferably can occur not only on the same image processing station at which it was begun, but also on another image processing station. This ensures that the imaging modality itself, with its integrated image processing station, is available without restrictions for a task with higher priority than the post-processing.

For this purpose, the process data stored upon an interruption preferably are ported within a network between two image processing stations to which the respective image processing stations are connected. Alternatively, the process data can be transferred by means of a removable storage medium such as, for example, a flash memory, a chip card, a PDA, etc. Both image processing stations can belong to the image processing system, however, transport of the process data to an external image processing station not belonging to the appertaining image processing system, for example in a different medical practice, is also possible. Moreover, transport of the process data over a general network such as, for example, the Internet or a point-to-point connection, for example via a telephone line from network-to-network, or from image processing station-to-image processing station, is also possible. Given use of external data lines, an encryption of the data preferably ensues before the transfer.

In a further development of the invention, a reminder function runs within the image processing system that reminds an operator about an interrupted process. This reminder function can be customized by a user, meaning the operator can set, for example, when, under which conditions and in which manner he or she would like to be reminded of which interrupted post-processing processes, or types of post-processing processes. Such individual preferences or other user-dependent presets can also in particular be ported within the image processing system.

The process data preferably are stored according to a general standard that is defined for data storage for the medical field or is generally used in this field. The DICOM standard (DICOM=Digital Imaging and Communication in Medicine) is preferably used for this purpose.

DESCRIPTION OF THE DRAWINGS

FIG. 3 schematically illustrates the use of an embodiment of the inventive method in a network of an image processing system.

DESCRIPTION OF THE PREFERRED EMBODIMENT

Figure 1:
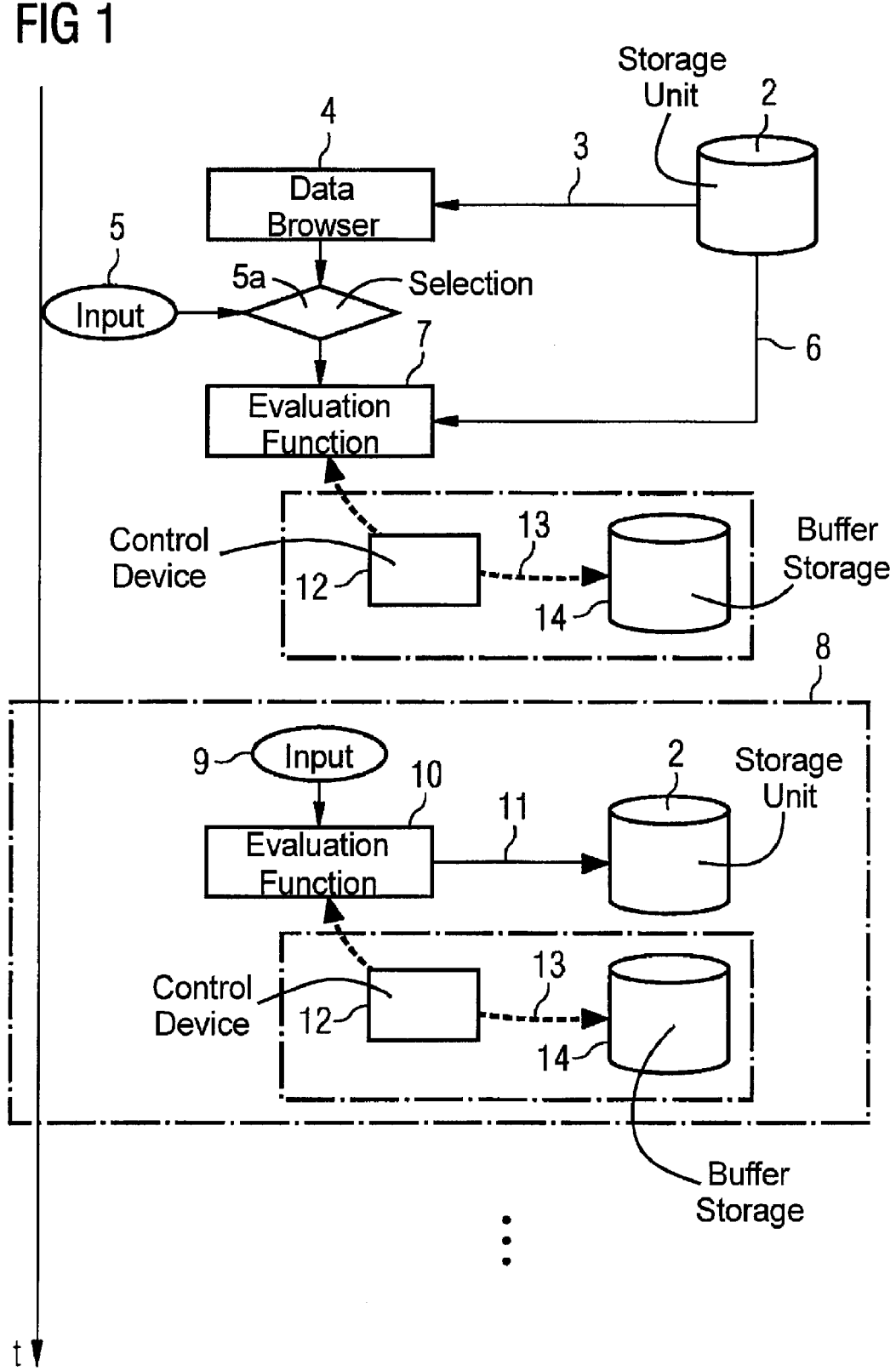
FIG. 1 is a block diagram of a post-processing procedure according to the invention.

In FIG. 1, the principle steps of a conventional, predominantly manually-controlled post-processing process within an image processing system 1 are shown together with the inventive steps to address the problems associated with the known procedure. The arrow designated with t at the left edge represents increasing time.

An image overview 3 is first loaded into a data browser 4 from a storage unit 2 in which, among other things, any type of raw image data measured by a modality are stored. The storage unit 2 can be, for example, part of the imaging modality. In addition to specific overview images, the image overview 3 can include further brief information regarding the various studies or image series, such as names of the patients, point in time of acquisition, pre-diagnosis, etc. This information and overview images are normally ordered and retrievable in the form of a patient list.

According to an input 5 of an operator, the data are viewed and, if applicable, selected. The input 5 can be a user-specific input or, for example, arbitrary data, specifications of parameters and settings, etc. This input 5 in particular includes a selection specification by means of which a selection 5a of specific images, image series or studies can be affected. Normally, the studies or image series necessary for the desired evaluation are manually selected by the operating personnel from the patient list graphically displayed on a monitor, for example loaded (using a "drag-and-drop function") onto post-processing cards which are likewise graphically represented on the screen surface. Each post-processing card is associated with a specific working procedure. The associated, selected raw image data 6 are then transferred from the storage unit 2 of an evaluation function 7 to a processing unit. The processing unit with all types of evaluation functions 7 can, like the data browser 4, be realized in the form of software on a suitable processor of a control panel of the modality itself or another image processing station, for example a workstation.

A more complete post-processing procedure normally includes a number of sub-steps 8 in which, respectively based on further inputs 9 of the operator, further evaluation functions 10 are activated for execution of the appertaining sub-step 8. In FIG. 1, of this only are sub-step 8 is schematically shown in the form of a dashed function block. This function block, if necessary, can be repeatedly implemented, whereby the concrete inputs 9 of the operator and the concrete evaluation functions 10 can be changed. This overview shows that a complete post-processing of the image data means a relatively high work-expenditure and time-expenditure for the operator.

The results 11 generated in the various sub-steps 8 are—insofar as they are parts of the end result such as, for example, finished images—stored in the storage unit 2. This is not true for intermediate results necessary within the process or for only half-finished partial results.

Every interruption of this largely manually-proceeding method conventionally has meant a complete cancellation with total data loss of all previous inputs by the operator, in particular settings of the evaluation functions as well as possible previous, already elaborately-generated intermediate results or, respectively, half-finished partial results. The entire post-processing process must then be started again from the beginning and re-run with a manual review of the image overview 3 in the data browser 4 and the most varied selection processes and process settings.

To avoid this problem, in accordance with the inventive method the post-processing procedure can be interrupted at any time and to allow continuation again in the same process state at a later point in time. This additional functionality is schematically shown in FIG. 1 in the dotted box. With a suitable process control device 12, for a process interruption the current process data 13, meaning the currently valid settings, references, intermediate results, half-finished partial- or end-results, etc. are archived in a buffer storage 14, such that the currently used image processing station, for example the console of the modality or the workstation, is available for a different post-processing process. It is not absolutely necessary to again store data that is already stored in different storage locations. It is sufficient when, for example, suitable references for these data such as, for example, pointers to the storage location are stored with which these data are quickly found given a recall of the post-processing procedure.

For this, for example, the process control device 12 directly accesses the respective current evaluation function 7, 10. All internal states or the process data 13 characterizing the respective state can therewith be persistently archived in the storage unit 14 for rapid and reliable recall of the post-processing procedure at the point in time of an interruption. Given a retrieval of the post-processing procedure, the process control device 12 then causes the correct evaluation function 7, 10 to be retrieved and causes the associated process data 13 to be retrieved from the storage unit 14 and supplied for the appertaining evaluation function 7, 10. The process control device 12 is likewise preferably realized in the form of software on a processor of an image processing station.

Such an interruption of a post-processing procedure is normally initiated by the process control device 12, by the operator entering (not shown) a "pause command" on the user interface of the appertaining image processing station. The retrieval of the procedure ensues in a similar manner.

The storage unit 14 can be a separate storage unit. Alternatively, however, it can be a storage area of a larger storage facility, in particular the storage unit 2 for the image data 6 and results 11.

Figure 2:
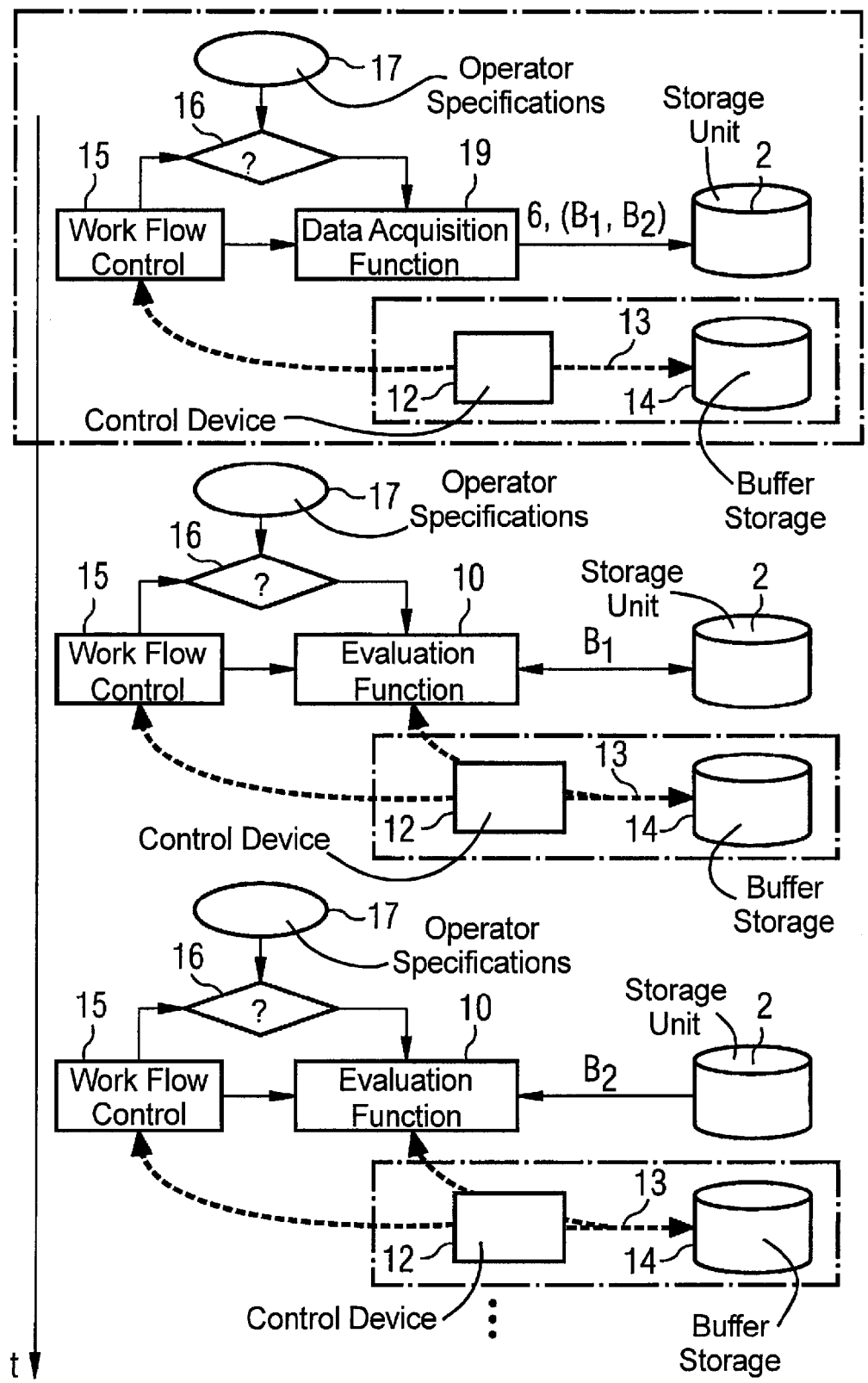
FIG. 2 is a flow chart of the inventive method.

FIG. 2 shows a very similar process which, however, is more workflow-oriented than the process in FIG. 1 and is less manually controlled. In this exemplary embodiment, the data acquisition at the modality, meaning the actual examination, is shown in addition to the actual post-processing procedure likewise having a number of sub-steps. The entire process is triggered by a workflow control unit 15 that initiates specific actions at specific points in time, for example poses questions to the operator and/or retrieves specific data acquisition functions 19 or evaluation functions 10.

In a first (shown uppermost) step, a data acquisition function 19 is initially retrieved into the modality by the workflow control unit 15. Parallel to this, specifications 17 of the operator such as, for example, fine adjustments of the regions to be exposed are queried (via the user interface of the modality) in a query function 16 for the impending data acquisition, meaning the measurement or acquisition of the raw image data by the modality. The acquired raw image data 6 are archived in a storage unit 2 for subsequently post-processing. Two image series $B_1$, $B_2$ are measured in the shown exemplary embodiment.

In the further post-processing procedure likewise triggered by the workflow control unit 15, both image series $B_1$, $B_2$ are then handled in separate sub-steps. Specifications 17 for the evaluation can be respectively requested again by the operator by means of a query function 16, meaning the operator is prompted, for example, for specification of a setting or the like.

In contrast to the preceding manual processing specified with reference to FIG. 1, in the case of the workflow-oriented execution not only is the respective evaluation function 10 accessed by the process control device 12, but also by the workflow control unit 15 as well in order to "freeze" the entire workflow with all data significant for it. All process data 13 are stored in turn for an identical continuation of the workflow from the point in time of the interruption in order to be later retrieved and continued.

The workflow control unit 15, the data acquisition 19 and the query functions 16 are preferably realized in the form of software on a processor of the modality or, respectively, the image processing station.

FIG. 3 shows the method specified in the preceding in an embodiment in an image processing system 1 (shown only schematically). This image processing system 1 here has (simplified) a modality 18, for example a CT device, a central mass storage 26, two workstations 23, 24 serving as image processing stations 23, 24, as well as a filming station 27 that are connected with a network via a bus 25.

The data acquisition 19 initially ensues in the modality controlled by the operator via a console of the modality 18.

Given a low temporal load of the system 1, the entire work is implemented on the modality 18 itself, from the data acquisition 19, over the data post-processing in a number of sub-steps with various evaluation functions 20, 21 up to the exposure 22 of a film. For this, the modality 18 is equipped with the full functionality of an image processing station as well as its own filming station.

However, insofar as an already-begun post-processing procedure must be interrupted, as specified above all process data 13 are exchanged out from the modality 18 into the main data storage 26 via the bus 25. The post-processing procedure is consequently shifted into a "suspend" state, which is again graphically represented by a dashed arrow. Here the procedure is exited during the implementation of a first evaluation sub-step with a first evaluation function 20. The modality 18 is thus available for a new process immediately and without restriction.

Since further post-processing possibilities are also available over the network with the further post-processing stations 23, 24, an evaluation function 28 which corresponds to the first evaluation function 20 on the modality 18 can then be recalled in one of the other image processing stations 23, and the necessary process data 13 can then be loaded from the main data storage 26 via the bus 25. The post-processing procedure is shifted again into a "resume" state, which is likewise graphically represented by a dashed arrow. Alternatively, the process data can be directly transferred from the modality 18 to the image processing station 23.

In the exemplary embodiment, the procedure is then once again interrupted at the image processing stations 23 during the implementation of a second evaluation sub-step with a second evaluation function 29. In an analogous manner, the then-current process data are again switched out into the main storage 26 via the bus 25. A continuation of the post-processing procedure then ensues again, in that an evaluation function 31 corresponding to the second evaluation function 29 on the image processing station 23 is retrieved into a third image processing station 24 and the necessary process data 13 are loaded from the main data storage 26 via the bus 25. The first evaluation function 30 of this image processing station 24 corresponds to the first evaluation functions 20, 28 of the modality 18 and the other image processing station 23. The second evaluation function 21 of the modality 18 likewise corresponds to the second evaluation functions 29, 31 of both image-processing stations 23, 24.

The main data storage 26 here performs multiple functions: at one time it is responsible as a storage for the raw image data 6 for the backup of the measurements for imaging modality 18, meaning as a storage for the data acquisition. Furthermore, here the end results are securely archived after the end of post-processing processes. These storages respectively ensue in the DICOM standard. Moreover, the process data 13 are archived in this main data storage 26 given an interruption and displacement of the post-processing procedure.

In order to prevent that an operator from forgetting about an already-begun and interrupted post-processing process, a reminder function preferably is started for each interrupted process. Since, for data protection and securing the described systems, every operator normally must log in via a secure access, at the latest the reminder function can remind the user about the interrupted processes in a simple and effective manner when an operator logs onto the system. The respective reminder function can be individualized and tailored to the respective wishes of an operator, from the type of notification to a reminder frequency.

The system architectures and processes shown in the figures are only exemplary embodiments that can be modified without those skilled in the art. In particular, the method can also be used in an image processing system which has only a single modality with an image-processing console and, if applicable, a further satellite console.

As already mentioned, the components necessary for the implementation of the inventive method can predominantly be realized in the form of software. In particular, an existing image processing systems or imaging modalities and image processing stations connected thereto, in which known post-processing processes are already implemented, can be retrofitted in order to also use these systems according to the inventive method. Insofar as these systems already include control devices with suitable infrastructure, if applicable an update of the control software with suitable control software modules is sufficient.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for post-processing image data acquired by an imaging modality comprising the steps of:
    at an electronic image processing station, executing a post-processing procedure acting on image data acquired by an imaging modality, including generating current process data during the execution of said post-processing procedure;
    upon an interruption of said post-processing procedure before completion of said post-processing procedure, automatically electronically storing said post-processing procedure, including all components thereof selected from the group consisting of partial procedures and sub-procedures, together with said current process data, at a point in time at which said interruption occurs; and
    allowing subsequent retrieval of said post-processing procedure and said current process data in a process state existing at said point in time.

2. A method as claimed in claim 1 comprising persistently electronically storing said current process data.

3. A method as claimed in claim 1 comprising automatically caching said current process data at temporal intervals during the execution of said post-processing procedure preceding said interruption.

4. A method as claimed in claim 1 wherein said image processing station is a first image processing station, and comprising retrieving said post-processing procedure and said current process data in said process state at a second image processing station, different from said first image processing station.

5. A method as claimed in claim 4 comprising porting at least said process data into a network to which said first and second image processing stations are connected.

6. A method as claimed in claim 4 comprising transferring said process data from said first image processing station to said second image processing station on a portable storage medium.

7. A method as claimed in claim 1 comprising executing a reminder function at said image processing station to provide an indication that execution of said post-processing procedure must be completed.

8. A method as claimed in claim 7 comprising automatically customizing said reminder function in said image processing station for a specific user of said image processing station.

9. A method as claimed in claim 7 comprising allowing user inputs into said image processing station for setting parameters of said reminder function.

10. A method as claimed in claim 1 comprising storing said processes data according to a medical data storage standard.

11. An image processing system comprising:
an image processing station having a computer loaded with a program for a post-processing procedure acting on image data acquired by an imaging modality, and a user interface allowing a user to execute said post-processing procedure at said image processing station; and
said image processing station comprising a process control device for, upon entry of an input via said interface that interrupts the execution of said post-processing procedure before completion of said post-processing procedure, archiving said post-processing procedure, including any partial procedures and sub-procedures thereof, together with all current process data generated up to a point in time of the interruption, and allowing retrieval of said post-processing procedure and said current process data in a process state existing at said point in time of the interruption.

12. A system as claimed in claim 11 wherein said image processing station is a first image processing station, and comprising at least a second image processing station, and a network electronically connecting said first and second image processing stations.

13. A system as claimed in claim 12 wherein said post-processing procedure and said current process data in said process state existing at said point in time of the interruption are retrieved at said second image processing station.

14. A system as claimed in claim 13 comprising respective data ports at said first and second image processing station allowing direct electronic transfer of said post-processing procedure and said current process data in said process state from said first image processing station to said second image processing station.

15. A system as claimed in claim 13 comprising a portable storage medium, insertable into and removable from each of said first and second image processing stations, on which said post-processing procedure and said current process data are stored in said process state existing at the time of the interruption, said portable storage medium being transportable from said first image processing station to said second image processing station.

16. A system as claimed in claim 11 wherein said image processing station comprises a reminder function generator for generating a reminder to a user that said post-processing procedure must be completed.

17. A computer-readable storage medium encoded with computer executable instructions for post-processing image data acquired by an imaging modality, said medium being loadable into a computerized image processing station and said instructions causing said image processing station to execute a post-processing procedure acting on image data acquired by an imaging modality, including generating current process data during the execution of said post-processing procedure and, upon an interruption of said post-processing procedure before completion of said post-processing procedure, to automatically electronically store said post-processing procedure, including all components thereof selected from the group consisting of partial procedures and sub-procedures, together with said current process data, at a point in time at which said interruption occurs, and to allow subsequent retrieval of said post-processing procedure and said current process data in a process state existing at said point in time.

* * * * *